US 8,290,966 B2

(12) United States Patent
Vignet

(10) Patent No.: US 8,290,966 B2
(45) Date of Patent: Oct. 16, 2012

(54) SYSTEM AND METHOD FOR IMPLEMENTING A NON-DESTRUCTIVE TREE FILTER

(75) Inventor: Peter Vignet, San Francisco, CA (US)

(73) Assignee: SAP Aktiengesellschaft, Walldorf (DE)

( * ) Notice: Subject to any disclaimer, the term of this patent is extended or adjusted under 35 U.S.C. 154(b) by 627 days.

(21) Appl. No.: 11/998,668

(22) Filed: Nov. 29, 2007

(65) Prior Publication Data
US 2009/0144315 A1  Jun. 4, 2009

(51) Int. Cl.
*G06F 17/30* (2006.01)
(52) U.S. Cl. .................................................. 707/754
(58) Field of Classification Search ............. None
See application file for complete search history.

(56) References Cited

U.S. PATENT DOCUMENTS

| | | | | |
|---|---|---|---|---|
| 5,455,945 | A * | 10/1995 | VanderDrift ............................. | 1/1 |
| 5,666,526 | A * | 9/1997 | Reiter et al. ............................. | 1/1 |
| 5,802,512 | A * | 9/1998 | Wallack ................................... | 1/1 |
| 5,870,758 | A * | 2/1999 | Bamford et al. ........................ | 1/1 |
| 5,920,867 | A * | 7/1999 | Van Huben et al. ..................... | 1/1 |
| 5,999,924 | A * | 12/1999 | Bair et al. ...................... | 707/700 |
| 6,005,928 | A * | 12/1999 | Johnson ..................... | 379/142.01 |
| 6,035,297 | A * | 3/2000 | Van Huben et al. .......... | 707/695 |
| 6,078,924 | A * | 6/2000 | Ainsbury et al. ....................... | 1/1 |
| 6,249,770 | B1 * | 6/2001 | Erwin et al. .................... | 705/10 |
| 6,289,336 | B1 * | 9/2001 | Melton et al. ................. | 707/765 |
| 6,298,338 | B1 * | 10/2001 | Melton et al. ................. | 707/765 |
| 6,301,583 | B1 * | 10/2001 | Zellweger ................. | 707/103 R |
| 6,317,738 | B1 * | 11/2001 | Lohman et al. ........................ | 1/1 |
| 6,324,535 | B1 * | 11/2001 | Bair et al. .............................. | 1/1 |
| 6,327,587 | B1 * | 12/2001 | Forster ................................... | 1/1 |
| 6,460,052 | B1 * | 10/2002 | Thomas et al. ................ | 707/695 |
| 6,493,718 | B1 * | 12/2002 | Petculescu et al. ........... | 707/600 |
| 6,557,012 | B1 * | 4/2003 | Arun et al. ............................. | 1/1 |
| 6,584,476 | B1 * | 6/2003 | Chatterjee et al. ..................... | 1/1 |
| 6,598,059 | B1 * | 7/2003 | Vasudevan et al. .................... | 1/1 |
| 6,631,374 | B1 * | 10/2003 | Klein et al. .................... | 707/638 |
| 6,631,386 | B1 * | 10/2003 | Arun et al. ............................. | 1/1 |
| 6,694,310 | B1 * | 2/2004 | Yu et al. ......................... | 707/718 |
| 6,708,186 | B1 * | 3/2004 | Claborn et al. ............... | 707/754 |
| 6,742,033 | B1 * | 5/2004 | Smith et al. ................... | 709/224 |
| 6,745,210 | B1 * | 6/2004 | Scanlan et al. ........................ | 1/1 |
| 6,750,864 | B1 * | 6/2004 | Anwar ........................... | 345/440 |
| 6,886,013 | B1 * | 4/2005 | Beranek ........................ | 715/234 |
| 6,990,238 | B1 * | 1/2006 | Saffer et al. .................. | 382/224 |
| 6,999,942 | B2 * | 2/2006 | Kemper et al. ................. | 705/38 |
| 7,028,057 | B1 * | 4/2006 | Vasudevan et al. ........... | 707/695 |
| 7,035,907 | B1 * | 4/2006 | Decasper et al. .............. | 709/212 |
| 7,047,250 | B1 * | 5/2006 | Agarwal et al. ....................... | 1/1 |
| 7,089,370 | B2 * | 8/2006 | Luick ............................. | 711/137 |

(Continued)

*Primary Examiner* — Mark A Radtke
(74) *Attorney, Agent, or Firm* — Blakely, Sokoloff, Taylor & Zafman LLP

(57) ABSTRACT

A system and method are described for filtering certain rows of a table while at the same time maintaining rows illustrating the ancestry of the filtered rows. For example, a computer-implemented method according to one embodiment of the invention comprises: receiving user-specified filtering criteria from a client comprising a value or range of values for filtering the rows of a table; filtering the table rows as indicated by the user-specified filtering criteria to generate a set of filtered rows; and generating a table containing the filtered rows and other rows which are ancestor rows to the filtered rows, notwithstanding the fact that one or more of the ancestor rows are not part of the set of filtered rows based on the user-specified filtering criteria, and excluding all other rows from the table.

21 Claims, 15 Drawing Sheets

U.S. PATENT DOCUMENTS

| | | | | |
|---|---|---|---|---|
| 7,096,216 B2 * | 8/2006 | Anonsen | | 707/781 |
| 7,099,999 B2 * | 8/2006 | Luick | | 711/137 |
| 7,133,875 B1 * | 11/2006 | Chatterjee et al. | | 1/1 |
| 7,143,339 B2 * | 11/2006 | Weinberg et al. | | 715/212 |
| 7,143,340 B2 * | 11/2006 | Brid | | 715/227 |
| 7,146,386 B2 * | 12/2006 | Xiao | | 1/1 |
| 7,209,933 B2 * | 4/2007 | Saxena | | 1/1 |
| 7,231,496 B2 * | 6/2007 | Curtis | | 711/137 |
| 7,231,596 B2 * | 6/2007 | Koren | | 715/210 |
| 7,254,610 B1 * | 8/2007 | Turner et al. | | 709/204 |
| 7,305,422 B1 * | 12/2007 | Wang | | 1/1 |
| 7,318,066 B2 * | 1/2008 | Kaufman et al. | | 1/1 |
| 7,333,992 B2 * | 2/2008 | Krishnamoorthy et al. | | 1/1 |
| 7,334,185 B2 * | 2/2008 | Wicks | | 715/204 |
| 7,366,741 B2 * | 4/2008 | Chatterjee et al. | | 1/1 |
| 7,373,524 B2 * | 5/2008 | Motsinger et al. | | 713/194 |
| 7,379,908 B2 * | 5/2008 | Clancey et al. | | 705/35 |
| 7,383,332 B2 * | 6/2008 | Chong et al. | | 709/224 |
| 7,403,958 B2 * | 7/2008 | Biswal et al. | | 1/1 |
| 7,418,431 B1 * | 8/2008 | Nies et al. | | 706/21 |
| 7,457,817 B2 * | 11/2008 | Krishnaswamy et al. | | 1/1 |
| 7,472,140 B2 * | 12/2008 | Agarwal et al. | | 1/1 |
| 7,502,894 B2 * | 3/2009 | Luo | | 711/144 |
| 7,509,307 B2 * | 3/2009 | Biswal et al. | | 1/1 |
| 7,533,057 B2 * | 5/2009 | Whipple et al. | | 705/38 |
| 7,533,136 B2 * | 5/2009 | Idicula et al. | | 1/1 |
| 7,536,335 B1 * | 5/2009 | Weston et al. | | 705/37 |
| 7,543,004 B2 * | 6/2009 | Idicula et al. | | 1/1 |
| 7,552,149 B2 * | 6/2009 | Sinha et al. | | 1/1 |
| 7,555,425 B2 * | 6/2009 | Oon | | 704/9 |
| 7,555,502 B2 * | 6/2009 | Chandrasekaran | | 1/1 |
| 7,555,532 B2 * | 6/2009 | Decasper et al. | | 709/217 |
| 7,558,779 B2 * | 7/2009 | Luo | | 1/1 |
| 7,610,272 B2 * | 10/2009 | Zurek | | 1/1 |
| 7,614,006 B2 * | 11/2009 | Molander | | 715/764 |
| 7,617,212 B2 * | 11/2009 | Faller et al. | | 1/1 |
| 7,647,327 B2 * | 1/2010 | Aguren | | 707/999.1 |
| 7,657,652 B1 * | 2/2010 | Balaji | | 709/242 |
| 7,685,155 B2 * | 3/2010 | Cengiz et al. | | 707/999.103 |
| 7,716,066 B2 * | 5/2010 | Rosow et al. | | 705/2 |
| 7,720,695 B2 * | 5/2010 | Rosow et al. | | 705/2 |
| 7,730,032 B2 * | 6/2010 | Idicula et al. | | 707/638 |
| 7,734,479 B2 * | 6/2010 | Rosow et al. | | 705/2 |
| 7,734,619 B2 * | 6/2010 | Vierich et al. | | 707/718 |
| 7,756,723 B2 * | 7/2010 | Rosow et al. | | 705/2 |
| 7,769,781 B1 * | 8/2010 | Huntley | | 707/791 |
| 7,774,558 B2 * | 8/2010 | Ferren et al. | | 711/154 |
| 7,805,444 B2 * | 9/2010 | Roche et al. | | 707/736 |
| 7,809,724 B2 * | 10/2010 | Roche et al. | | 707/736 |
| 7,836,028 B1 * | 11/2010 | Agarwal et al. | | 707/695 |
| 7,840,561 B2 * | 11/2010 | Jones et al. | | 707/736 |
| 2002/0143780 A1 * | 10/2002 | Gorman | | 707/100 |
| 2003/0153338 A1 * | 8/2003 | Herz et al. | | 455/517 |
| 2003/0229848 A1 * | 12/2003 | Arend et al. | | 715/509 |
| 2005/0055426 A1 * | 3/2005 | Smith et al. | | 709/219 |
| 2006/0064476 A1 * | 3/2006 | Decasper et al. | | 709/223 |
| 2006/0242100 A1 * | 10/2006 | Luo | | 707/1 |
| 2006/0242119 A1 * | 10/2006 | Luo | | 707/3 |
| 2006/0242120 A1 * | 10/2006 | Luo | | 707/3 |
| 2007/0073635 A1 * | 3/2007 | Vignet | | 707/1 |
| 2007/0162312 A1 * | 7/2007 | Soderberg | | 705/3 |
| 2007/0179942 A1 * | 8/2007 | Heggem | | 707/5 |
| 2007/0192474 A1 * | 8/2007 | Decasper et al. | | 709/223 |

* cited by examiner

| Structure Element ID ◆▷ | Strucure Element Description ◆▷ | Plant ◆▷ | Type ◆▷ |
|---|---|---|---|
| | 1000 | | |
| 1000\ID2200 | 1000 | 1000 | 1MATERIAL |
| 1000\ID2300 | 1000 | 1000 | 1MATERIAL |

*Fig. 3*

| Name ≑ | Cost ≑ | Id ≑ | Parent Id ≑ | Sibling ≑ | Nbr Children ≑ |
|---|---|---|---|---|---|
| 3 | | | | | |
| ▶ Node 1 | 1,000 | 1 | 0 | 0 | 2 |
| ▶ Node 2 | 3,000 | 2 | 1 | 0 | 2 |
| · Node 3 | 6,000 | 3 | 2 | 0 | 0 |
| ▶ Node 4 | 7,000 | 4 | 3 | 0 | 2 |
| · Node 5 | 7,001 | 5 | 3 | 1 | 0 |
| ▶ Node 6 | 6,001 | 6 | 2 | 1 | 2 |
| · Node 7 | 7,001 | 7 | 6 | 0 | 0 |
| · Node 8 | 7,002 | 8 | 6 | 1 | 0 |
| ▶ Node 9 | 3,001 | 9 | 1 | 1 | 2 |
| ▶ Node 10 | 6,001 | 10 | 9 | 0 | 2 |
| · Node 11 | 7,001 | 11 | 10 | 0 | 0 |
| · Node 12 | 7,002 | 12 | 10 | 1 | 0 |
| ▶ Node 13 | 6,002 | 13 | 9 | 1 | 2 |
| · Node 14 | 7,002 | 14 | 13 | 0 | 0 |
| · Node 15 | 7,003 | 15 | 13 | 1 | 0 |
| ▶ Node 16 | 1,001 | 16 | 0 | 1 | 2 |
| ▶ Node 17 | 3,001 | 17 | 16 | 0 | 2 |
| ▶ Node 18 | 6,001 | 18 | 17 | 0 | 2 |
| · Node 19 | 7,001 | 19 | 18 | 0 | 0 |
| · Node 20 | 7,002 | 20 | 18 | 1 | 0 |
| ▶ Node 21 | 6,002 | 21 | 17 | 1 | 2 |
| · Node 22 | 7,002 | 22 | 21 | 0 | 0 |
| · Node 23 | 7,003 | 23 | 21 | 1 | 0 |
| ▶ Node 24 | 3,002 | 24 | 16 | 1 | 2 |
| ▶ Node 25 | 6,002 | 25 | 24 | 0 | 2 |
| · Node 26 | 7,002 | 26 | 25 | 0 | 0 |
| · Node 27 | 7,003 | 27 | 25 | 1 | 0 |
| ▶ Node 28 | 6,003 | 28 | 24 | 1 | 2 |
| · Node 29 | 7,003 | 29 | 28 | 0 | 0 |
| · Node 30 | 7,004 | 30 | 28 | 1 | 0 |

Row 1 of 30

*Fig. 6*

| | Name ◁▷ | Cost ◁▷ | Id ◁▷ | Parent id ◁▷ | Sibling ◁▷ | Nbr Children ◁▷ |
|---|---|---|---|---|---|---|
| ▽ | 3 | | | | | |
| ▲ | Node 3 | 6,000 | 3 | 2 | 0 | 2 |
| ▲ | Node 13 | 6,002 | 13 | 9 | 1 | 2 |
| ■ | Node 23 | 7,003 | 23 | 21 | 1 | 0 |
| ■ | Node 30 | 7,004 | 30 | 28 | 1 | 0 |

Row 1 of 4

| Name | Cost | Id | Parent id | Sibling | Nbr Children |
|---|---|---|---|---|---|
| Node 3 | 6,000 | 3 | 2 | 0 | 2 |
| Node 13 | 6,002 | 13 | 9 | 1 | 2 |
| Node 23 | 7,003 | 23 | 21 | 1 | 0 |
| Node 30 | 7,004 | 30 | 28 | 1 | 0 |

Fig. 9

| Name | Cost | Id | Parent id | Sibling | Nbr Children |
|---|---|---|---|---|---|
| 3 | 6002 | | | | |
| | | | | | |
| | | | | | |
| | | | | | |
| Node 13 | 6,002 | 13 | 9 | 1 | 2 |

Row 1 of 6

*Fig. 10*

| | Name | Cost | Id | Parent id | Sibling | Nbr Children |
|---|---|---|---|---|---|---|
| | 3 | 6002 | | | | |
| ▶ | Node 1 | 1,000 | 1 | 0 | 0 | 2 |
| ▲ | Node 2 | 3,000 | 2 | 1 | 0 | 2 |
| ▶ | Node 9 | 3,001 | 9 | 1 | 1 | 2 |
| ▲ | Node 10 | 6,001 | 10 | 9 | 0 | 2 |
| ▲ | Node 13 | 6,002 | 13 | 9 | 1 | 2 |
| ▲ | Node 16 | 1,001 | 16 | 0 | 1 | 2 |

Row 1 of 6

SYSTEM AND METHOD FOR IMPLEMENTING A NON-DESTRUCTIVE TREE FILTER

BACKGROUND

1. Field of the Invention

This invention relates generally to the field of data processing systems. More particularly, the invention relates to a system and method for implementing a non-destructive tree filter.

2. Description of the Related Art

Multi-Tiered Enterprise Computing Systems

Traditional client-server systems employed a two-tiered architecture such as that illustrated in FIG. 1a. Applications 102 executed on the client side 100 of the two-tiered architecture are comprised of a monolithic set of program code including a graphical user interface component, presentation logic, business logic and a network interface that enables the client 100 to communicate over a network 103 with one or more servers 101. A database 104 maintained on the server 101 provides non-volatile or "persistent" storage for the data accessed and/or processed by the application 102.

The "business logic" component of the application represents the core program code of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1a become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1b. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logical components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1b may be implemented using a variety of different application technologies at each of the layers of the multi-tier architecture, including those based on the Java 2 Enterprise Edition™ ("J2EE") standard, the Microsoft.NET standard and/or the Advanced Business Application Programming ("ABAP") standard developed by SAP AG. For example, as described below, in a J2EE environment, the business layer 122, which handles the core business logic of the application, is comprised of Enterprise Java Bean ("EJB") components with support for EJB containers. Within a J2EE environment, the presentation layer 121 is responsible for generating servlets and Java Server Pages ("JSP") interpretable by different types of browsers at the user interface layer 120.

J2EE Application Server Architecture

FIG. 1c illustrates a typical J2EE application server 200 in which the presentation layer is implemented by a "Web container" 211 and the business layer is implemented by an Enterprise Java Bean ("EJB") container 201. Containers are runtime environments which provide standard common services 219, 209 to runtime components. For example, the Java Naming and Directory Interface ("JNDI") is a service that provides application components with methods for performing standard naming and directory services. Containers also provide unified access to enterprise information systems 217 such as relational databases through the Java Database Connectivity ("JDBC") service, and legacy computer systems through the J2EE Connector Architecture ("JCA") service. In addition, containers provide a declarative mechanism for configuring application components at deployment time through the use of deployment descriptors.

As illustrated in FIG. 1c, each layer of the J2EE architecture includes multiple containers. The Web container 211, for example, is itself comprised of a servlet container 215 for processing servlets and a Java Server Pages ("JSP") container 216 for processing Java server pages. The EJB container 201 includes three different containers for supporting three different types of enterprise Java beans: a session bean container 205 for session beans, a entity bean container 206 for entity beans, and a message driven bean container 207 for message driven beans. A more detailed description of J2EE containers and J2EE services can be found in RAGAE GHALY AND KRISHNA KOTHAPALLI, SAMS TEACH YOURSELF EJB IN 21 DAYS (2003) (see, e.g., pages 353-376).

SUMMARY

A system and method are described for filtering certain rows of a table while at the same time maintaining rows illustrating the ancestry of the filtered rows. For example, a computer-implemented method according to one embodiment of the invention comprises: receiving user-specified filtering criteria from a client comprising a value or range of values for filtering the rows of a table; filtering the table rows as indicated by the user-specified filtering criteria to generate a set of filtered rows; and generating a table containing the filtered rows and other rows which are ancestor rows to the filtered rows, notwithstanding the fact that one or more of the ancestor rows are not part of the set of filtered rows based on the user-specified filtering criteria, and excluding all other rows from the table.

BRIEF DESCRIPTION OF THE DRAWINGS

A better understanding of the present invention can be obtained from the following detailed description in conjunction with the following drawings, in which:

FIG. 3 illustrates a filtering operation within an exemplary table.

FIG. 6 illustrates an exemplary table prior to the execution of a filtering operation.

FIG. 7 illustrates filtering performed without maintaining ancestor rows of the filtered rows.

FIG. 9 illustrates a table filtered in accordance with one embodiment of the invention.

FIG. 10 illustrates the results of the table from FIG. 9 filtered a second time in accordance with one embodiment of the invention.

FIG. 11 illustrates a table filtered in accordance with another embodiment of the invention in which text is displayed within ancestor rows.

DETAILED DESCRIPTION OF PREFERRED EMBODIMENTS

Figure 1A:
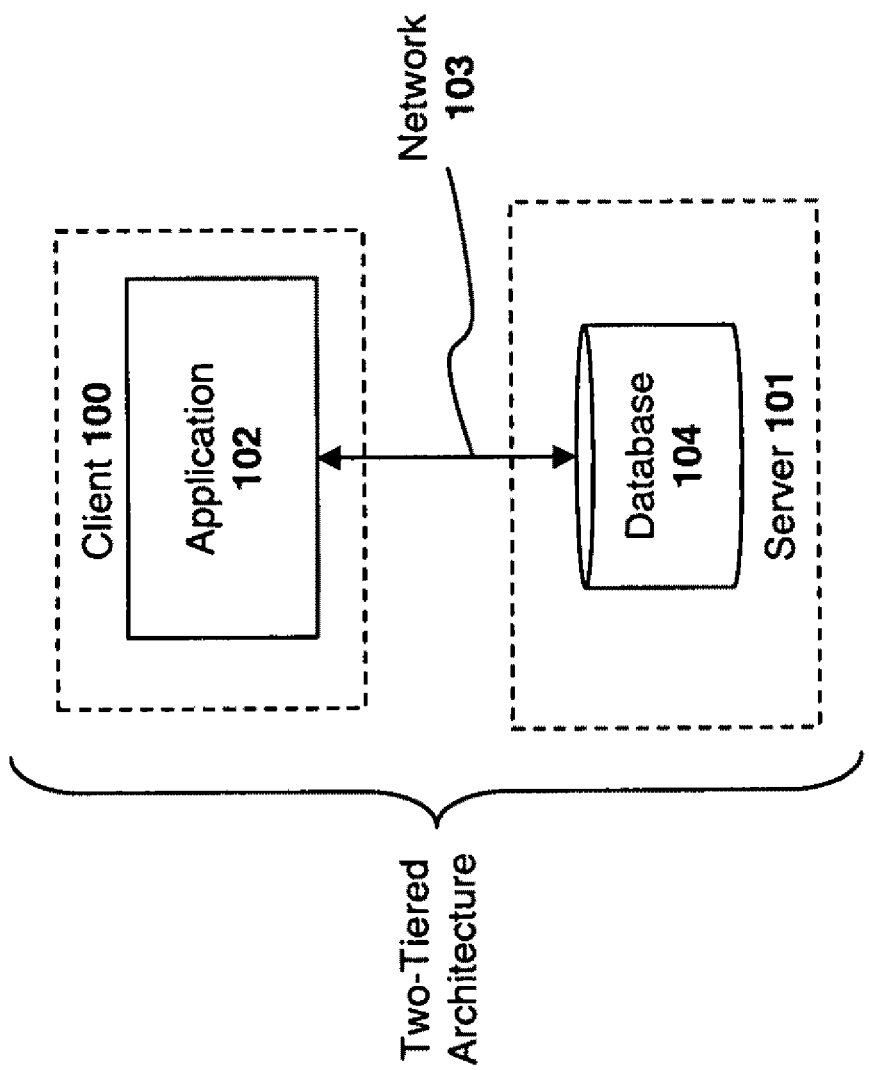
FIG. 1a illustrates a traditional two-tier client-server architecture.
Figure 1B:
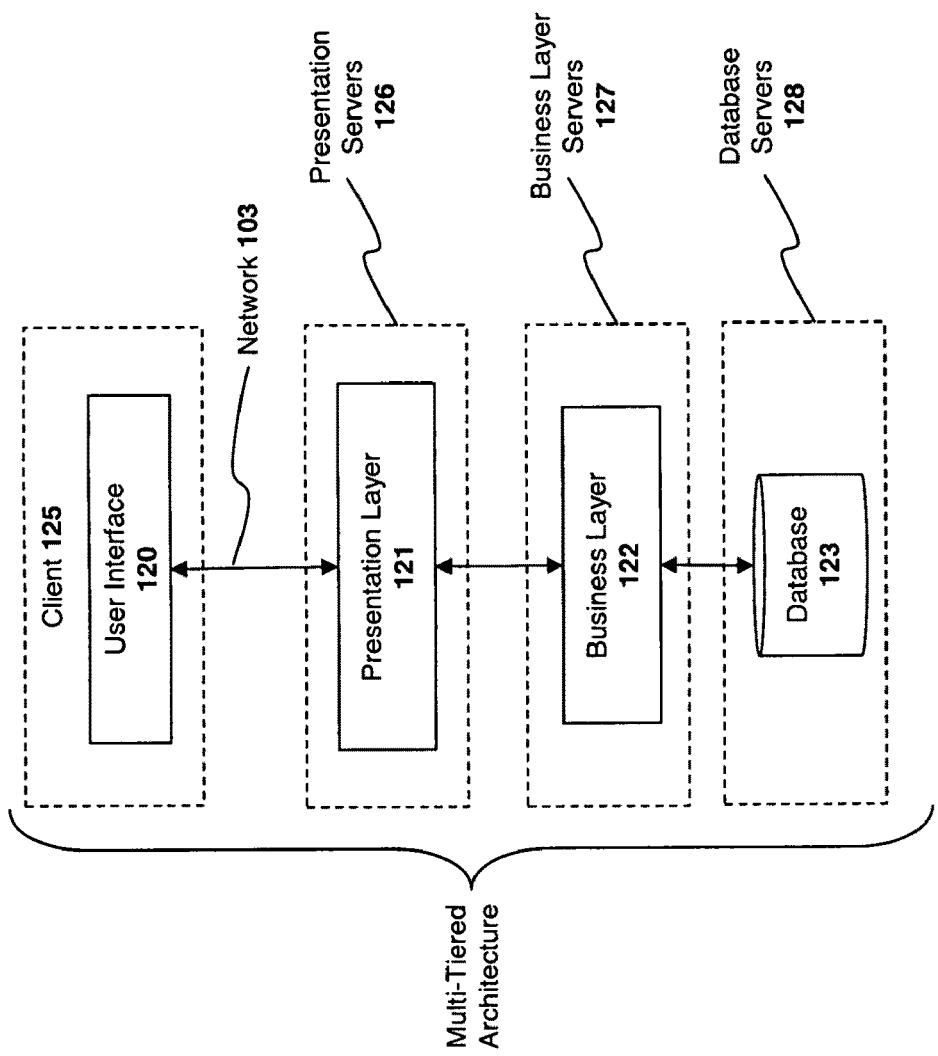
FIG. 1b illustrates a prior art multi-tier client-server architecture.
Figure 1C:
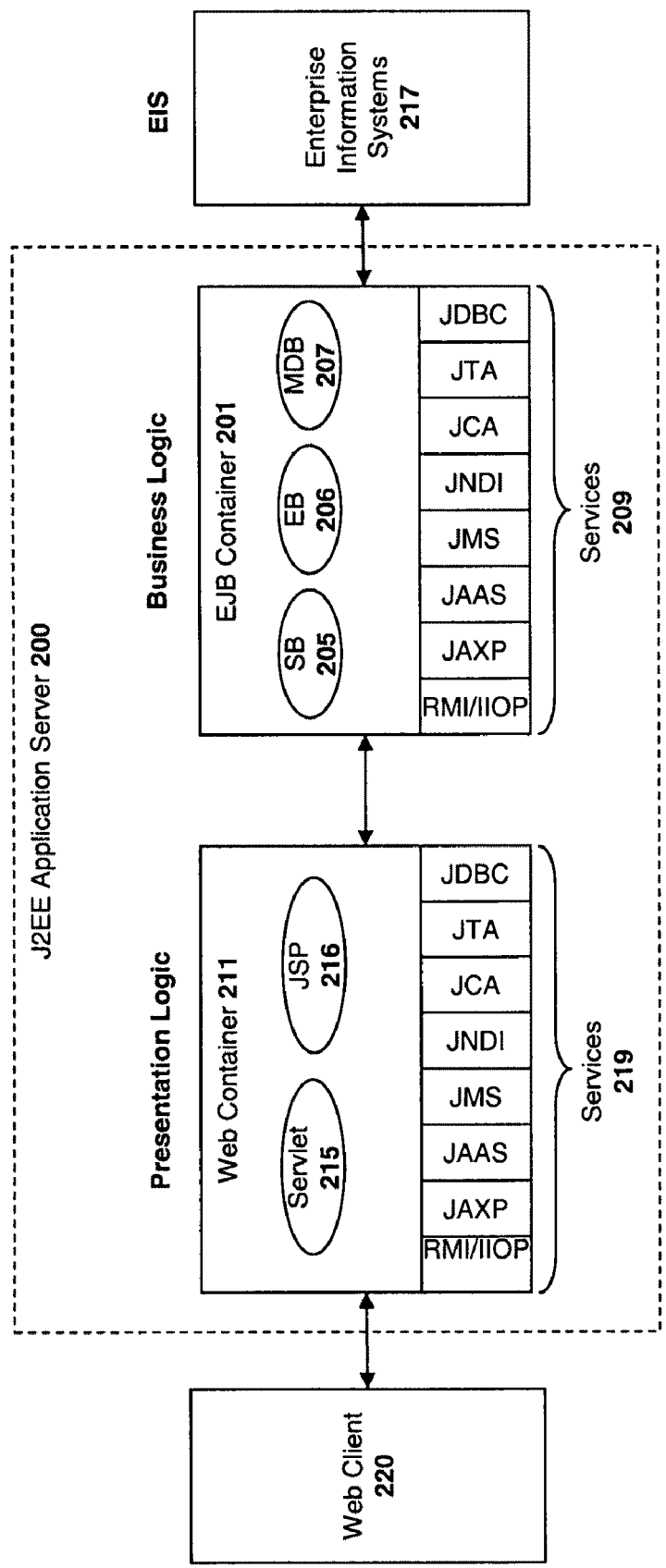
FIG. 1c illustrates a multi-tiered application server architecture according to the Java 2 Enterprise Edition ("J2EE") standard.

Described below is a system and method for performing filtering operations on hierarchical tables while maintaining hierarchical relationships for the results of the filtering operations. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

The display of data records in tables and forms, and the associated editing of the tables and forms (e.g., selecting, deleting, sorting, etc) by clients are central functions in Web-based applications. Thus, various techniques are provided within the J2EE architecture for creating and working with tables in response to client requests. In particular, under a model-view-controller ("MVC") architecture, illustrated in FIG. 2, Web-based content using tables may be created within the Web Container 211 using "controllers" 240 and "views" 251-252 that operate in conjunction with "models" 260 within the EJB container 201. A detailed description of the MVC architecture is beyond the scope of the present application but, briefly, the controller 240 manages the underlying table structure and data, referred to in FIG. 2 as a table node 250. The table structure is presented to Web clients 220 in the form of one or more "views" 251-252 which indicate, for example, how the table is presented within a Web page. Controllers may be implemented by servlets and views by Java server pages. The model 260 within the EJB container 201 provides an interface between the controller 240 and the underlying table data stored within the database 123. See, e.g., GHALY and KOTHAPALLI mentioned above for additional detail on the MVC architecture at pages 148-152.

A context node 250 may be filtered and/or otherwise modified in response to requests from Web clients. For example, as part of a search request a Web client may designate a filtering operation such as "only display client records in the table beginning with the letters DE" or "only display client records with a value of 1000." As a result the table node will be filtered and the results provided to the client in the form of a filtered table.

Various existing application server platforms employ a Model View Controller architecture to generate views for requesting clients. For example, "Web Dynpro" is a programming paradigm developed by SAP AG (the assignee of the present application) which implements a Model View Controller architecture for generating and displaying views (e.g., tables) to end users. While certain embodiments of the invention are described herein within the context of Web Dynpro, it should be noted that the underlying principles of the invention are not limited to any particular programming paradigm.

As illustrated in FIG. 3, a Web Dynpro table 300 represents a two-dimensional data set arranged in rows 301, 303 and columns 302. The table 302 represents data from the view context and receives its data from a multi-element context node, represented by node 250 in FIG. 2. At runtime, each element of the multi-element context node is represented as a table row. The number of table rows is therefore equal to the number of node elements. The table columns correspond to the node attributes.

The controller 240 within the Model View Controller architecture implements a table filter which filters table rows based on user-specified filtering criteria. In the exemplary table 300 shown in FIG. 3, the filtering row is the first row 301. In the illustrated example, the column labeled "Structure Element Description" has been filtered for a value of 1000 and the filter has been applied to all rows of the table, resulting in two rows 303 being displayed which correspond to the value of 1000.

Figure 4:
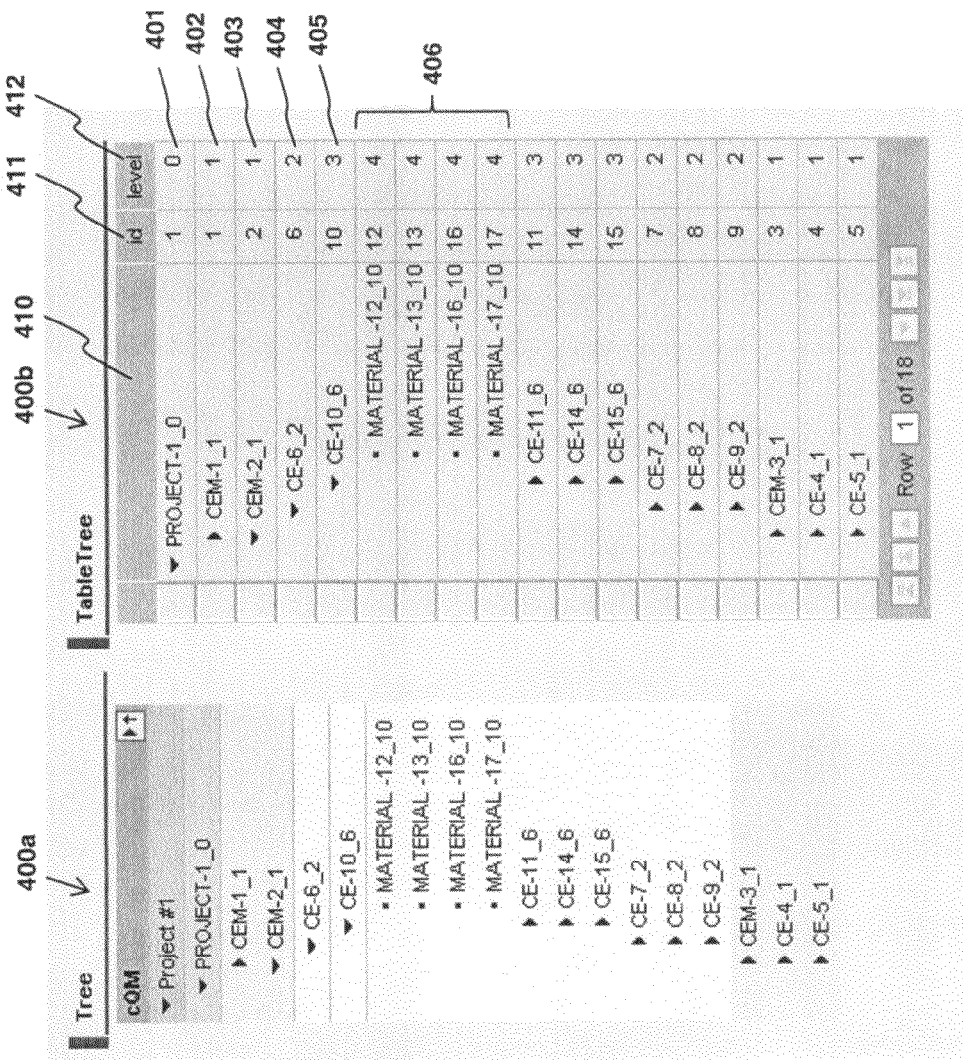
FIG. 4 illustrates an exemplary hierarchical tree and tree table.

As illustrated in FIG. 4, within programming environments such as Web Dynpro, a "Tree" 400a or "Table Tree" 400b may be used to represent hierarchical structures. In a table tree 400b, table rows are presented in a specific order to indicate parent-child relationships. FIG. 4 illustrates an exemplary hierarchical table tree in which row 401 is a parent to rows 402-403; row 403 is a parent to row 404; row 404 is a parent to row 405; and row 405 is a parent to rows 406. As illustrated in the figure, the position and graphical features associated with each element within a particular column 410 identify the position that the element occupies within the hierarchy.

Figure 2:
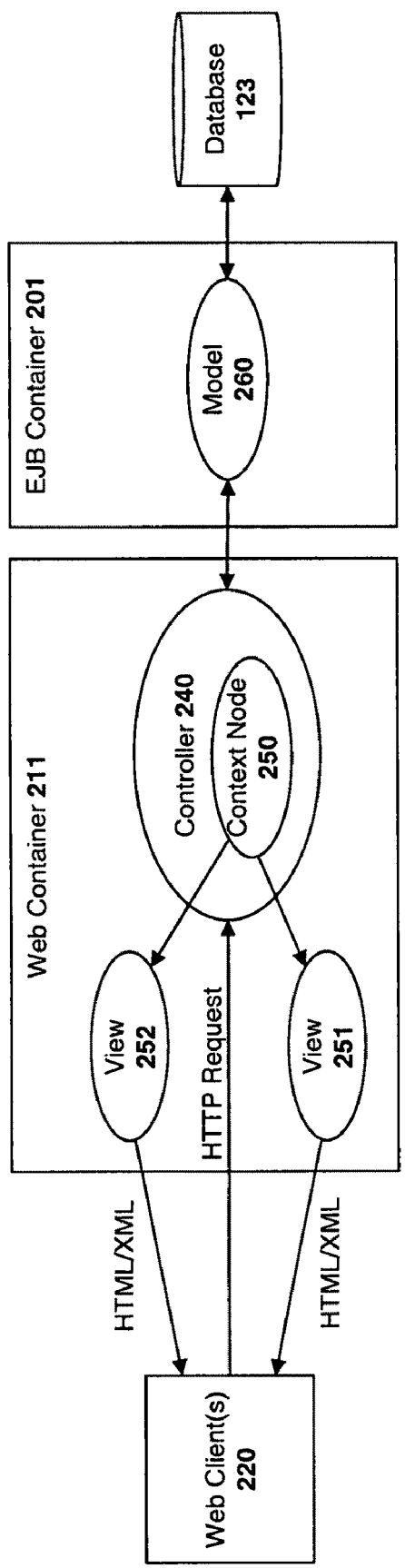
FIG. 2 illustrates a model view controller ("MVC") architecture implemented in accordance with one embodiment of the invention.

In a model-view controller architecture such as the one shown in FIG. 2, a context, implemented as context node 250, provides data to the user interface elements within a view 252, 251. For a Tree 400a or Table Tree 400b, context data may be embodied in "recursive" context nodes with each hierarchical level represented by a different recursive node. In FIG. 4, the table 400b indicates five levels starting from 0. Consequently, the table has a four recursive node context.

Figure 5:
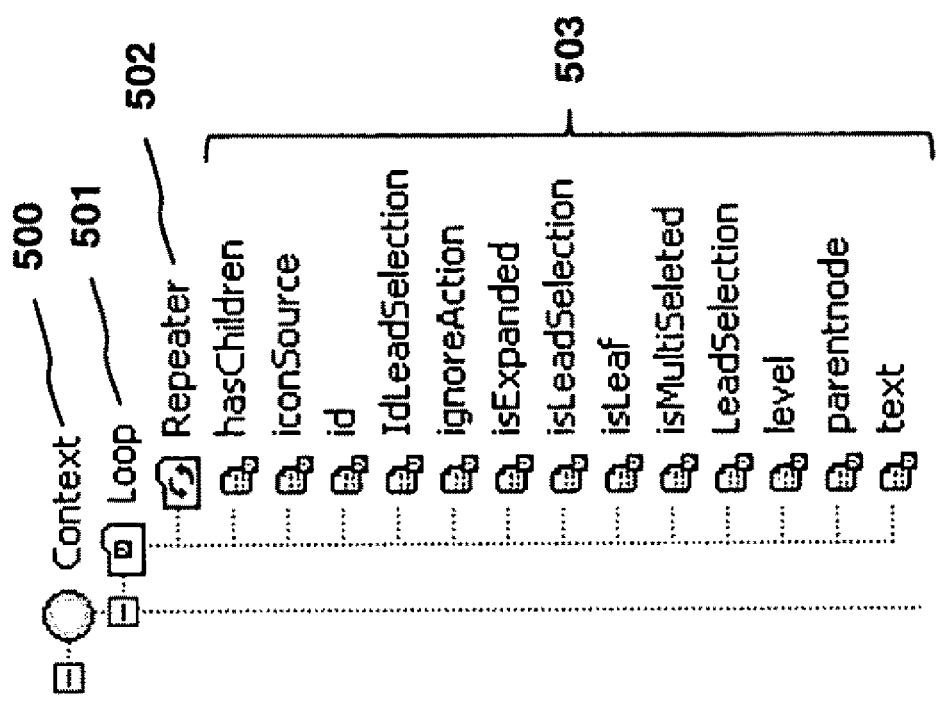
FIG. 5 illustrates a context including a recursive context not and associated attributes, some of which are displayed within the table in FIG. 4.

FIG. 5 illustrates an exemplary context 500 having a node called Loop 501 and its recursive nodes represented by the recursive node called Repeater 502. The dual arrows within the folder icon identifies the Repeater node as a recursive node, i.e., a node with sub-nodes which are not visually displayed. Thus, for simplicity, recursive nodes are represented as only a single node even though they have sub-nodes.

The number of recursive sub-nodes depends on the number of levels in the hierarchy and the number of dependent sub-sub-node elements.

Each recursive node 502 has attributes 503 which may be displayed within a view for the user. An attribute corresponds to a column in a table tree. For example, the attributes "id" and "level" are displayed within columns 411 and 412 of tree table 400*b*. A recursive node element corresponds to a row on the table. Because the table 400*b* illustrates 18 rows, the context node Repeater has 18 elements.

Each sub-node is attached to an element of its parent element and so on. A node or an element cannot exist independently; it has to be attached to a parent element. In other words, a sub-node element can only be created from its parent element and can also be accessed only from its parent element.

One problem which exists is related to how different elements in the hierarchy are displayed in response to a table filtering operation. If the same rules as those applied to filtering a flat table are used, i.e., the filtered rows that do not match the filter criteria are not shown, the hierarchy may become inaccurate.

This is illustrated in FIGS. 6 and 7. In FIG. 6, under the column Name, Node 3 in row 603 has Node 2 in row 602 for a parent, Node 13 in row 605 has Node 9 in row 604 for a parent, Node 23 in row 607 has Node 21 in row 606 for a parent, and Node 30 in row 609 has Node 28 in row 608 for a parent. If the column Name is filtered for a string value of "3" using a classical flat table representation of a filtered table (i.e., showing only the rows that meet the filtering criteria), the resulting table 700 is illustrated in FIG. 7. The problem with this representation is that the Node 23 and Node 30 seem to both have Node 13 as a parent node. In addition, Node 3 and Node 13 also appear to have the same parent node. In other words, the last leaf node of a tree branch may meet the filtering criteria, but not its parent nodes. So, the classical presentation of a filtered flat table shows the leaf node as a child of a grand-parent node. Consequently, this representation may be confusing to the end user.

One embodiment of the invention solves this problem by allowing hierarchical rows to be filtered without destroying the visual depiction of the hierarchy. The filtered rows having passed the filtering criteria are shown from the root node with all parent nodes expanded. The data within the filtered rows may be highlighted (e.g., bolded, colored) to distinguish the filtered data. The rows which have not passed the filter's criteria may show no data, or data in a non-highlighted format (e.g., relatively small, un-bolded, and/or uncolored characters).

Figure 8A:
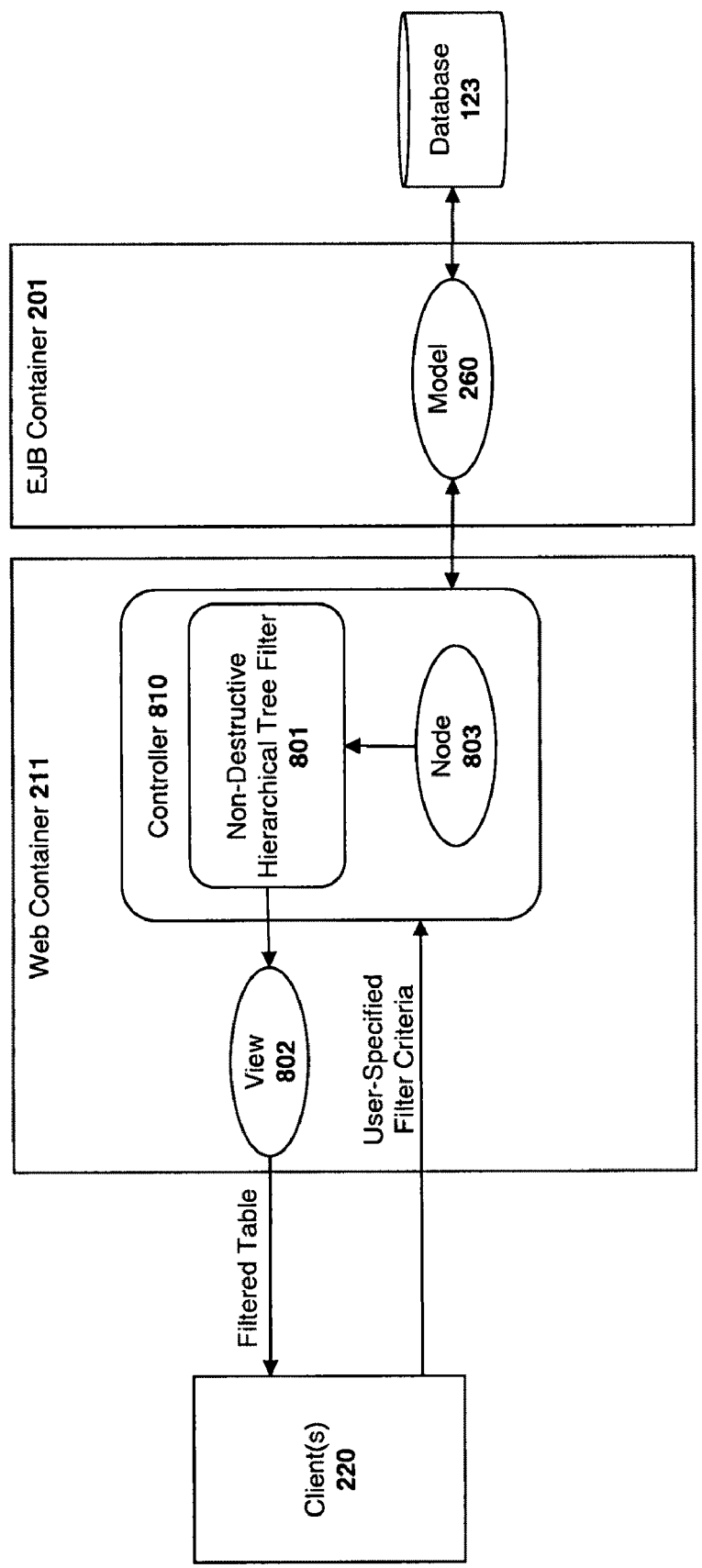
FIG. 8a illustrates a system architecture according to one embodiment of the invention.

An architecture according to this embodiment of the invention is illustrated in FIG. 8*a* which shows a controller 810 within a model view controller architecture generating a table view 802 in response to user requests. The controller 810 of this embodiment includes a non-destructive hierarchical tree filter 801 for filtering table data within a node 803 (e.g., a multi-element context node) while still maintaining the visual representation of the hierarchy between table rows. In one embodiment, the user specifies filtering criteria through the client 220 (e.g., by entering the criteria via a Web browser) and the non-destructive table row filter responsively filters the model data 260 to generate a filtered table such as the one illustrated in FIG. 9. In one embodiment, the client sends request and receives responses using the Hypertext Transport Protocol (HTTP). However, the underlying principles of the invention are not limited to any particular protocol.

Figure 8B:
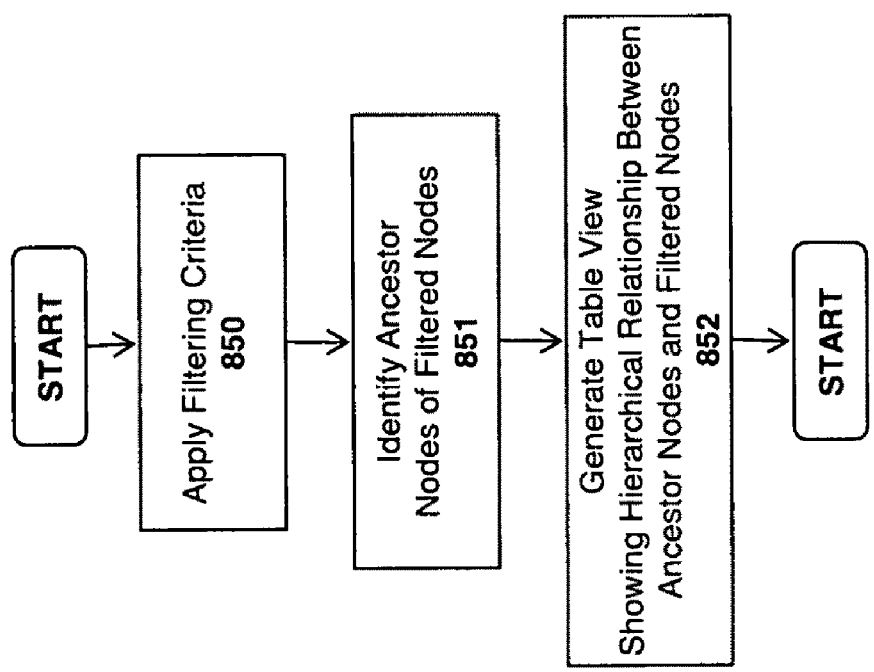
FIG. 8b illustrates a computer-implemented method according to one embodiment of the invention.

A method implemented by the non-destructive hierarchical tree filter 801 is illustrated in FIG. 8*b*. At 850 the non-destructive hierarchical tree filter 801 applies the filtering criteria specified by the end user to filter the table rows. At 851, the non-destructive hierarchical tree filter 801 identifies the ancestor rows/nodes of the filtered rows/nodes. Finally, at 852, the non-destructive hierarchical tree filter 801 generates a table view which maintains the hierarchical relationship between the filtered rows and the ancestor rows. As described below, the non-destructive hierarchical tree filter 801 highlights or provides some other graphical and/or textual indication to contrast the filtered rows and the ancestor rows.

FIG. 9 illustrates an exemplary table generated in response to a filtering operation in which the hierarchy associated with each of the filtered rows is preserved. In this embodiment, the rows 901 that do not meet the user-specified filtering criteria have no data. In contrast to the table illustrated in FIG. 7, the table in FIG. 9 clearly shows that the Node 23 and Node 30 do not share the same parent node and that Node 3 and Node 13 do not share same parent node. The data for all the rows meeting the filtering criteria are shown and the full path to the ancestor rows is displayed (e.g., parent nodes, grand-parent nodes, etc).

Figure 10:
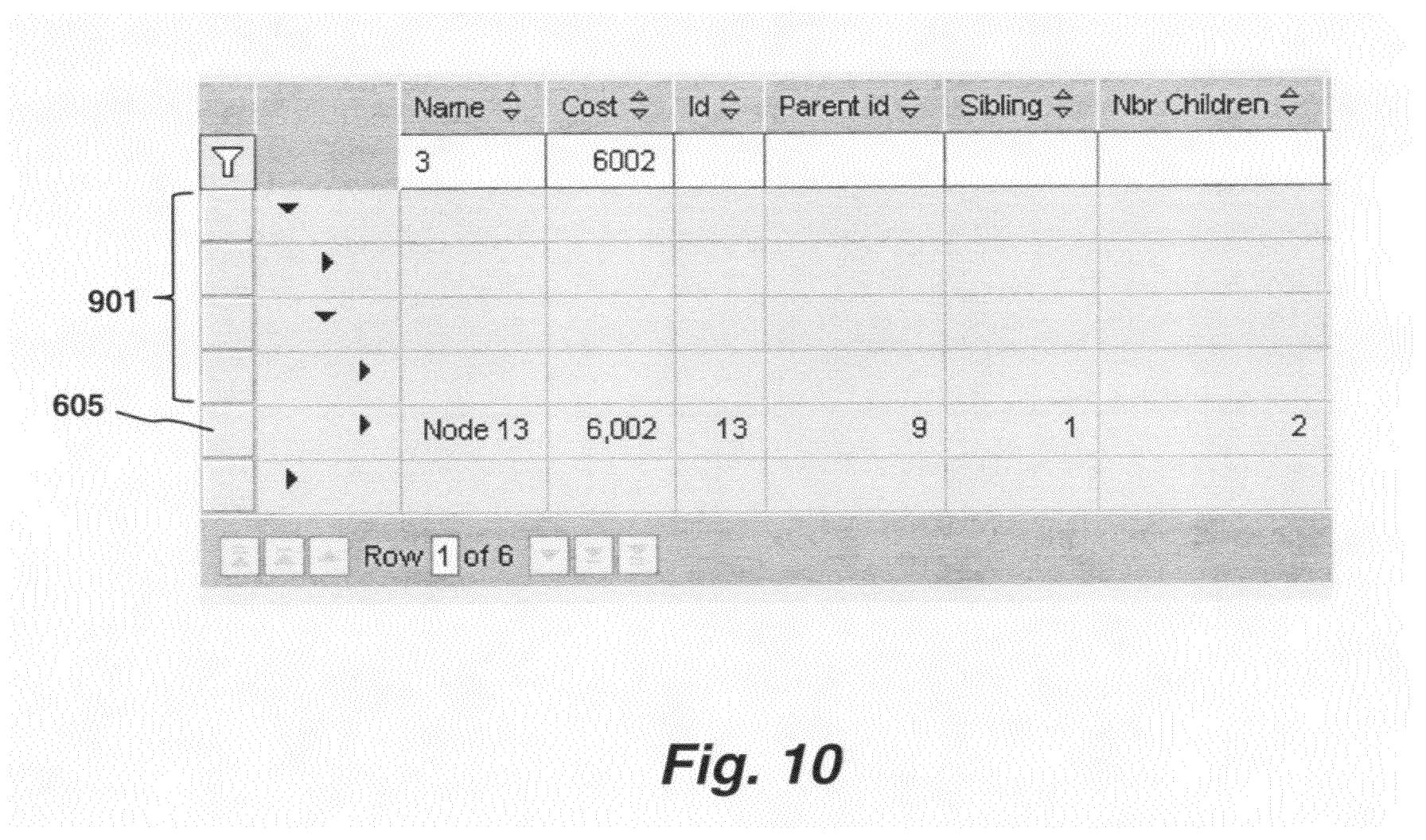

As illustrated in FIG. 10, the user may specify additional filtering criteria to filer the table rows a second time. In FIG. 10, for example, the Cost attribute has been filtered using the value 6,002. The only row that meets both sets of filtering criteria (i.e., Name=3 and Cost=6002) is row 605. As such, row 605 is displayed along with the ancestor rows 901 of row 605 to maintain the hierarchy. As illustrated in FIGS. 9-10, any rows which are not a filtered row or an ancestor to a filtered row are excluded from the resulting table.

In the above representations, the nodes that do not match the criteria have no data. In another embodiment, the data of the filtered rows is distinguished form the other data using highlighting. For example, the data of the filtered rows may be shown in bold, and the data in the remaining rows may be shown in normal text and/or in a relatively smaller font. Various other techniques for distinguishing the rows which meet the filtering criteria may be employed while still complying with the underlying principles of the invention (e.g., using color, font, size, etc).

An exemplary table according to this embodiment is illustrated in FIG. 11, which shows one row 1101 that meets the filtering criteria. The data of the filtered row 1101 is in bold and the data within the remaining rows 1102 is displayed in smaller, normal text. Thus, the user can easily identify the rows which meet the filtering criteria as well as the ancestor rows associated with the filtered rows.

Although the embodiments of the invention are described herein within the context of a table tree 400*b*, the same general principles also apply to tree 400*a*. If the filter table is a java Class it can be implemented as a common class without any additional coding for the developer.

In summary, a system and method to filter and present filtered hierarchical rows in a tree table or tree has been described. The filtered rows are presented without destroying the hierarchical representation so the user is not confused about the location of the filtered rows within the hierarchy. The rows that do not meet the filter criteria show no data, or data in a different format (e.g., a small font), but they are still displayed so the hierarchy is not destroyed. In one embodiment, the non-destructive hierarchical tree filter is implemented as a common Java Class without the need for additional coding by the developer.

Figure 12:
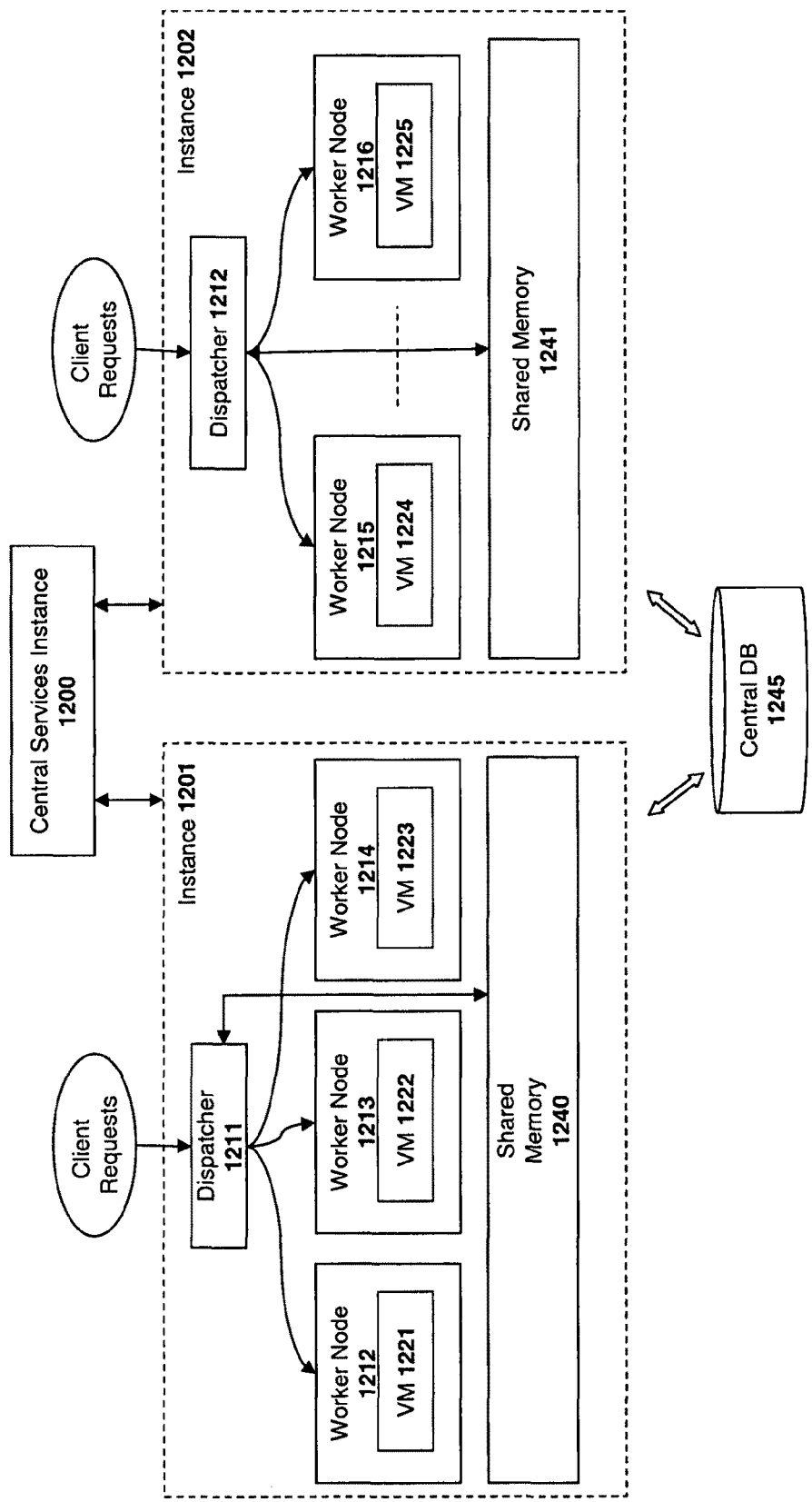
FIG. 12 illustrates an application server architecture on which embodiments of the invention may be implemented.

A system architecture on which embodiments of the invention may be implemented is illustrated in FIG. 12. The architecture includes a plurality of application server "instances" 1201 and 1202. The application server instances 1201 and 1202 each include a group of worker nodes 1212-1214 and 1215-1216 (also sometimes referred to herein as "server nodes"), respectively, and a dispatcher 1211 and 1212, respectively. The application server instances 1201, 1202 communicate through a central services instance 1200 using message passing. In one embodiment, the central services instance 1200 includes a locking service and a messaging service (described below). The combination of all of the application server instances 1201 and 1202 and the central services instance 1200 is referred to herein as a "cluster." Although the following description will focus solely on instance 1201 for the purpose of explanation, the same principles apply to other instances within the cluster.

The worker/server nodes 1212-1214 within instance 1201 provide the business and presentation logic for the network applications supported by the system including, for example, the model-video controller architecture described herein. Each of the worker nodes 1212-1214 within a particular instance may be configured with a redundant set of programming logic and associated data, represented as virtual machines 1221-1223 in FIG. 12. In one embodiment, the dispatcher 1211 distributes service requests from clients to one or more of the worker nodes 1212-1214 based on the load on each of the servers. For example, in one embodiment, the dispatcher maintains separate queues for each of the 1212-1214 in a shared memory 1240. The dispatcher 1211 fills the queues with client requests and the worker nodes 1212-1214 consume the requests from each of their respective queues. The client requests may be from external clients (e.g., browser requests) or from other components/objects within the instance 1201 or cluster.

In one embodiment, the worker nodes 1212-1214 may be Java 2 Enterprise Edition ("J2EE") worker nodes which support Enterprise Java Bean ("EJB") components and EJB containers (at the business layer) and Servlets and Java Server Pages ("JSP") (at the presentation layer). In one embodiment, JSPs are used to implement the different views 1012 described above, and servlets are used to implement the controllers 1010. In this embodiment, the virtual machines 1221-1225 implement the J2EE standard (as well as the additional non-standard features described herein). It should be noted, however, that certain high-level features described herein may be implemented in the context of different software platforms including, by way of example, Microsoft.NET platforms and/or the Advanced Business Application Programming ("ABAP") platforms developed by SAP AG, the assignee of the present application.

In one embodiment, communication and synchronization between each of the instances 1201, 1202 is enabled via the central services instance 1200. As mentioned above, the central services instance 1200 includes a messaging service and a locking service. The message service allows each of the servers within each of the instances to communicate with one another via a message passing protocol. For example, messages from one server may be broadcast to all other servers within the cluster via the messaging service (e.g., such as the cache configuration messages described below). Alternatively, messages may be addressed directly to specific servers within the cluster (i.e., rather than being broadcast to all servers). In one embodiment, the locking service disables access to (i.e., locks) certain specified portions of configuration data and/or program code stored within a central database 1245. The locking service locks data on behalf of various system components which need to synchronize access to specific types of data and program code. In one embodiment, the central services instance 1200 is the same central services instance as implemented within the Web Application Server version 6.3 and/or 6.4 developed by SAP AG. However, the underlying principles of the invention are not limited to any particular type of central services instance.

In addition, unlike prior systems, one embodiment of the invention shares objects across virtual machines 1221-1225. Specifically, in one embodiment, objects such as session objects which are identified as "shareable" are stored within a shared memory region 1240, 1241 and are made accessible to multiple virtual machines 1221-1225. Creating new object instances from scratch in response to client requests can be a costly process, consuming processing power and network bandwidth. As such, sharing objects between virtual machines as described herein improves the overall response time of the system and reduces server load.

In a shared memory implementation, a shared memory area 1240, 1241 or "heap" is used to store data objects that can be accessed by multiple virtual machines 1221-1225. The data objects in a shared memory heap should generally not have any pointers or references into any private heap (e.g., the private memory regions/heaps of the individual virtual machines). This is because if an object in the shared memory heap had a member variable with a reference to a private object in one particular virtual machine, that reference would be invalid for all the other virtual machines that use that shared object.

More formally, this restriction can be thought of as follows: For every shared object, the transitive closure of the objects referenced by the initial object should only contain shared objects at all times. Accordingly, in one implementation of the invention, objects are not put into the shared memory heap by themselves—rather, objects (such as the session objects described herein) are put into the shared memory heap in groups known as "shared closures." A shared closure is an initial object plus the transitive closure of all the objects referenced by the initial object.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions.

Throughout the foregoing description, for the purposes of explanation, numerous specific details were set forth in order to provide a thorough understanding of the invention. It will be apparent, however, to one skilled in the art that the invention may be practiced without some of these specific details. For example, although many of the embodiments set forth above relate to a Web Dynpro, Java or J2EE implementation, the underlying principles of the invention may be implemented in virtually any client-server environment. Moreover, although some of the embodiments set forth above are implemented within a shared memory environment, the underlying principles of the invention are equally applicable to a non-shared memory environment. Finally, it should be noted that the terms "client" and "server" are used broadly to refer to any applications, components or objects which interact over a network.

Accordingly, the scope and spirit of the invention should be judged in terms of the claims which follow.

What is claimed is:

1. A computer-implemented method comprising:
    receiving user-specified filtering criteria from a client comprising a value or range of values for filtering the rows of a table having a hierarchy such that at least some rows have child-ancestor relations;
    filtering the table rows as indicated by the user-specified filtering criteria to identify a set of filtered rows; and
    displaying a table containing the filtered rows and ancestor rows of the filtered rows, even if the ancestor rows are not part of the set of filtered rows based on the user-specified filtering criteria, excluding all rows from the table that are neither a member of the set of filtered rows nor an ancestor of a member of the set of filtered rows.

2. The method as in claim 1 wherein displaying a table further comprises:
    formatting the filtered rows using a first graphical and/or textual format; and
    formatting the ancestor rows of the filtered rows using a second graphical and/or textual format.

3. The method as in claim 2 wherein the first graphical and/or textual format comprises bold text and the second graphical and/or textual format comprises text in a smaller font than that used for the first graphical and/or textual format.

4. The method as in claim 2 wherein the first graphical and/or textual format comprises the existence of text within the rows and the second graphical and/or textual format comprises no text within the rows.

5. The method as in claim 2 wherein the first graphical and/or textual format comprises text having a first color and the second graphical and/or textual format comprises text having a second color.

6. The method as in claim 1 wherein the user-specified filtering criteria are transmitted by the client using the Hypertext Transport Protocol (HTTP) and wherein the table generated in response to the user-specified filtering criteria is sent to the client using HTTP.

7. The method as in claim 1 wherein displaying a table further comprises retrieving data for the table from a model within a model-view-controller architecture.

8. A system comprising a memory for storing program code and a processor for processing the program code to perform the operations of:
    receiving user-specified filtering criteria from a client comprising a value or range of values for filtering the rows of a table having a hierarchy such that at least some rows have child-ancestor relations;
    filtering the table rows as indicated by the user-specified filtering criteria to identify a set of filtered rows; and
    displaying a table containing the filtered rows and ancestor rows of the filtered rows, if the ancestor rows are not part of the set of filtered rows based on the user-specified filtering criteria, excluding all other rows from the table that are neither a member of the set of filtered rows nor an ancestor of a member of the set of filtered rows.

9. The system as in claim 8 wherein displaying a table further comprises:
    formatting the filtered rows using a first graphical and/or textual format; and
    formatting the ancestor rows of the filtered rows using a second graphical and/or textual format.

10. The system as in claim 9 wherein the first graphical and/or textual format comprises bold text and the second graphical and/or textual format comprises text in a smaller font than that used for the first graphical and/or textual format.

11. The system as in claim 9 wherein the first graphical and/or textual format comprises the existence of text within the rows and the second graphical and/or textual format comprises no text within the rows.

12. The system as in claim 9 wherein the first graphical and/or textual format comprises text having a first color and the second graphical and/or textual format comprises text having a second color.

13. The system as in claim 8 wherein the user-specified filtering criteria are transmitted by the client using the Hypertext Transport Protocol (HTTP) and wherein the table generated in response to the user-specified filtering criteria is sent to the client using HTTP.

14. The system as in claim 8 wherein displaying a table further comprises retrieving data for the table from a model within a model-view-controller architecture.

15. A machine-readable medium having program code stored thereon which, when executed by a machine, causes the machine to perform the operations of:
    receiving user-specified filtering criteria from a client comprising a value or range of values for filtering the rows of a table having a hierarchy such that at least some rows have child-ancestor relations;
    filtering the table rows as indicated by the user-specified filtering criteria to identify a set of filtered rows; and
    displaying a table containing the filtered rows and ancestor rows of the filtered rows, even if the ancestor rows are not part of the set of filtered rows based on the user-specified filtering criteria, excluding all other rows from the table that are neither a member of the set of filtered rows nor an ancestor of a member of the set of filtered rows.

16. The machine-readable medium as in claim 15 wherein displaying a table further comprises:
    formatting the filtered rows using a first graphical and/or textual format; and
    formatting the ancestor rows of the filtered rows using a second graphical and/or textual format.

17. The machine-readable medium as in claim 16 wherein the first graphical and/or textual format comprises bold text and the second graphical and/or textual format comprises text in a smaller font than that used for the first graphical and/or textual format.

18. The machine-readable medium as in claim 16 wherein the first graphical and/or textual format comprises the existence of text within the rows and the second graphical and/or textual format comprises no text within the rows.

19. The machine-readable medium as in claim 16 wherein the first graphical and/or textual format comprises text having a first color and the second graphical and/or textual format comprises text having a second color.

20. The machine-readable medium as in claim 15 wherein the user-specified filtering criteria are transmitted by the client using the Hypertext Transport Protocol (HTTP) and wherein the table generated in response to the user-specified filtering criteria is sent to the client using HTTP.

21. The machine-readable medium as in claim 15 wherein displaying a table further comprises retrieving data for the table from a model within a model-view-controller architecture.

* * * * *

UNITED STATES PATENT AND TRADEMARK OFFICE
CERTIFICATE OF CORRECTION

PATENT NO. : 8,290,966 B2
APPLICATION NO. : 11/998668
DATED : October 16, 2012
INVENTOR(S) : Peter Vignet Page 1 of 1

It is certified that error appears in the above-identified patent and that said Letters Patent is hereby corrected as shown below:

In the Claims, Column 9, Claim 8, line 54, delete "rows, if" and insert --rows, even if--.

Signed and Sealed this
Fourteenth Day of May, 2013

Teresa Stanek Rea
*Acting Director of the United States Patent and Trademark Office*